US006438484B1

(12) United States Patent
Andrew et al.

(10) Patent No.: US 6,438,484 B1
(45) Date of Patent: Aug. 20, 2002

(54) METHOD AND APPARATUS FOR DETECTING AND COMPENSATING FOR COMPRESSOR SURGE IN A GAS TURBINE USING REMOTE MONITORING AND DIAGNOSTICS

(75) Inventors: Philip Lynn Andrew, Glenville; Chung-hei Simon Yeung, Niskayuna, both of NY (US); John David Stampfli, Greer, SC (US); Joseph Anthony Cotroneo, Clifton Park, NY (US); Steven Mark Schirle, Anderson; James Michael Hill, Simpsonville, both of SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/863,021

(22) Filed: May 23, 2001

(51) Int. Cl.[7] .............................. G06F 19/00; F02C 9/18
(52) U.S. Cl. ........................ 701/100; 340/966; 415/55.7
(58) Field of Search .......................... 701/100; 415/118, 415/57.4, 55.2, 55.7, 55.1; 340/966; 416/26

(56) References Cited

U.S. PATENT DOCUMENTS

| | | | | |
|---|---|---|---|---|
| 5,205,116 A | * | 4/1993 | Ng | 60/39.281 |
| 5,448,881 A | * | 9/1995 | Patterson et al. | 415/26 |
| 5,726,891 A | * | 3/1998 | Sisson et al. | 415/17 |
| 6,231,301 B1 | | 5/2001 | Barnett et al. | 415/57.4 |
| 6,231,306 B1 | | 5/2001 | Khalid | 416/26 |

* cited by examiner

*Primary Examiner*—Tan Nguyen
(74) *Attorney, Agent, or Firm*—Nixon & Vanderhye

(57) ABSTRACT

A method is disclosed for monitoring and controlling a compressor including (a) monitoring at least one compressor parameter; (b) storing data indicative of the monitored parameter in a database system; (c) processing the collected data using a stall precursor detection algorithm to determine a stall precursor; (d) comparing the stall precursor with at least one of a corresponding average compressor value, and a corresponding unit specific value to determine the level of compressor operability, and (e) if the stall precursor varies from at least one of the average compressor value and the unit specific value, performing corrective actions to vary the level of compressor operability to prevent a surge condition.

26 Claims, 3 Drawing Sheets

METHOD AND APPARATUS FOR DETECTING AND COMPENSATING FOR COMPRESSOR SURGE IN A GAS TURBINE USING REMOTE MONITORING AND DIAGNOSTICS

FIELD OF THE INVENTION

This invention relates to non-intrusive techniques for monitoring gas turbines. More particularly, the present invention relates to a method and apparatus for pro-actively monitoring the performance of a compressor by detecting precursors to a compressor surge event, and to determine and adjust the margin between the operating line of the compressor to its surge line.

BACKGROUND OF THE INVENTION

The global market for efficient power generation equipment has been expanding at a rapid rate since the mid-1980's. This trend is projected to continue in the future. The gas turbine combined-cycle power plant, consisting of a gas-turbine based topping cycle and a Rankine-based bottoming cycle, continues to be a preferred choice by power generation customers. This preference may be due to the relatively-low plant investment cost, the continuously-improving operating efficiency of the gas turbine based combined cycle, and the resulting favorable cost of electricity production using gas turbine combined cycle plants.

Elevated firing temperatures in the combustor of a gas turbine enable increases in combined cycle efficiency and specific output power. For a given firing temperature, an optimal cycle compressor pressure ratio exists which maximizes combined-cycle efficiency. This optimal cycle compressor pressure ratio is theoretically shown to increase with increasing combustor-firing temperature. Accordingly, there is a need for higher compressor pressure ratio in gas turbines due to the demands for increased power generation efficiency and increased combustor firing temperature.

In gas turbines used for power generation, a compressor preferably operates at a higher pressure-ratio to achieve a higher efficiency. During operation of a gas turbine, there may occur a phenomenon known as compressor stall and even surge, wherein the pressure-ratio of the compressor initially exceeds some critical value at a given speed, resulting in a rapid reduction of compressor pressure-ratio and airflow delivered to the combustor. Compressor stall results when the airflow separates from one or more compressor blades. Compressor surge results when the pressure ratio through the compressor becomes excessive and the airflow separates from all the compressor blades in one or more rows of a compressor. In surge, the compressor performance falls due to the inability of the compressor to handle the excessive pressure ratio. Compressor surge may result from a variety of reasons, such as, for example, when the compressor inlet profile of airflow pressure or temperature becomes unduly distorted during normal operation of the compressor. Compressor damage due to the ingestion of foreign objects or a malfunction of a portion of the engine control system may also result in compressor surge and subsequent compressor degradation.

Gas turbine compressors, including the axial compressors used in most industrial gas turbines, are subjected to demands for ever-increasing levels of pressure ratio, with the simultaneous goals of minimal parts count, operational simplicity, and low overall cost. Further, an axial flow compressor may be expected to operate at a heightened level of cycle pressure ratio at a compression efficiency that augments the overall cycle efficiency of a combined cycle power generation system that includes a gas turbine. An axial flow compressor is also expected to perform in an aerodynamically and aero-mechanically stable manner, i.e., to avoid a surge event, over a wide range in mass flow rate associated with the varying power output characteristics of the combined cycle operation.

Compressor surge is to be avoided. Compressor surge is an unstable oscillatory condition that reduces the mean airflow through the combustor. However, the need for high-pressure ratio and high efficiency compressor performance demands that gas turbine compressors be operated near surge conditions. The operating compressor pressure ratio of an industrial gas turbine is typically set at a pre-specified margin away from the surge boundary, generally referred to as surge margin, to avoid unstable compressor operation. In the past, surge margins have been static. The surge margin was established for a compressor and was not varied during compressor operation. Because the surge margin was static, the margin had to be set to avoid surge even for the worst case compressor conditions. However, the compressor generally did not operate in such worst-case conditions.

In the past, compressors have been restricted to operate in conditions that avoid surge by a wide surge margin. A maximum operating line has been established for each compressor that provides a wide margin between the compressor's approved maximum operating conditions and the predicted surge conditions of a fleet average, i.e., not unit-specific.

The use of wide surge margins does not rely on sensing conditions that preceded surge. Surge margins are depended on the compressor speed, pressure ratio and flow rate. These conditions are not surge precursor conditions, but are general compressor operating conditions. To avoid surge and optimize performance, there is a long-felt need for systems that detect compressor conditions that precede surge, i.e., precursors to a surge event.

One approach to detecting a surge event is to monitor the air flow and pressure rise through the compressor. A range of values for the pressure rise is selected a-priori, beyond which the compressor operation is deemed to be unstable and the compressor operation is restricted to levels below the pre-selected range of values. In addition, rapid variations in the pressure rise across a compressor are monitored, as they also can be used to detect a surge event. Such pressure variations may be attributed to a number of causes such as, for example, unstable combustion, rotating stall, and surge events on the compressor itself. To determine these events, the magnitude and rate of change of pressure rise through the compressor are monitored. When such an event occurs, the magnitude of the pressure rise may drop sharply, and an algorithm monitoring the magnitude and its rate of change may acknowledge the event. This approach may detect a surge event that has already occurred. This approach, however, does not sense when surge is about to occur and does not provide a warning that the compressor is operating in conditions that are precursors to surge. This approach of identifying a surge event fails to offer prediction capabilities of rotating stall or surge event, and also fails to offer information to a real-time control system with sufficient lead time to issue surge avoidance actions, and thus fails to proactively deal to avoid a surge event.

BRIEF SUMMARY OF THE INVENTION

The system disclosed here affords a method of compressor surge prediction, surge monitoring, and surge control that protects a compressor from surge damage, allows compressors to be operated with a reduced surge margin without actually incurring surge, allows for higher pressure ratios, and allows for improved compressor efficiency. This invention also improves the gas turbine power-plant combined-cycle efficiency. Simultaneous need for high cycle pressure ratio, high compressor efficiency, and ample (albeit reduced) surge margin throughout the operating range of a compressor is also addressed.

More particularly, the present system and method proactively monitor and control a compressor by identifying surge precursor conditions using a stall precursor detection algorithm and by sensing measurable conditions of the compressor. In an exemplary embodiment, at least one sensor is disposed about a compressor for measuring at least one compressor parameter. Such parameters may include, for example, air pressure, airflow velocity, and compressor vibration. Multiple sensors capable of measuring different compressor parameters may also be employed.

The sensors used are dependent on the particular implementation of the surge monitoring and prediction system. For example, some of the sensors sense dynamic pressure parameters like compressor pressure, and velocity of gases flowing through the compressor. Upon collecting a pre-specified amount of data from the sensors, the data is time series analyzed and processed to extract signal characteristics such as, for example, signal amplitude, rate of change, spectral content of the signal. The signal characteristics represent stall precursors. The stall precursors are used to determine near-surge conditions of the compressor.

The measured stall precursor values are then compared with corresponding characteristics for a similar compressor and also with average stall precursor characteristics computed for a plurality of similar compressors (referred to as "fleet average"), and historical characteristics of the subject sensor. The compressor stall precursor characteristics are computed as a function of the underlying compressor operating parameters, such as, for example, pressure ratio, airflow, etc. and the comparison is used to estimate a degraded compressor operating map. The comparisons between the actual stall precursor values and the average stall precursor characteristics, or historical characteristics of the subject compressor yield a corresponding compressor operability measure. The compressor operability measure indicates whether the compressor is operating safely away from surge conditions.

Upon determining that the compressor is operating beyond a safe margin, for example, if the compressor is operating near surge conditions, then the real-time control system takes protective actions to mitigate risks to the compressor in order to maintain the required level of compressor operability In one aspect, the invention is a method for monitoring and controlling a compressor, comprising (a) monitoring at least one compressor parameter; (b) storing the compressor parameter in a database system; (c) processing the monitored data using a stall precursor detection algorithm to determine a stall precursor; (d) comparing the stall precursor with at least one of a corresponding average compressor value, and a corresponding unit specific value to determine the level of compressor operability, and (e) if the stall precursor varies from at least one of the average compressor value and the unit specific value, performing corrective actions to vary the level of compressor operability to prevent a surge condition.

In another aspect, the invention is an apparatus for monitoring a compressor, comprising at least one sensor operatively coupled to the compressor for monitoring at least one compressor parameter; a processor system for computing stall precursors from the monitored data; a database system for storing the at least one compressor parameter and the computed stall precursors, the database system further comprising a look-up-table comprising average compressor values for similar compressors; a comparator for comparing the computed stall precursors with at least one of an average precursor value and a previously computed stall measure of the compressor; and a control system for initiating corrective actions to prevent a compressor surge if the computed stall precursors deviate from at least one of the average precursor value and the previously computed stall measure.

In yet another aspect, the invention is an apparatus for monitoring and controlling a compressor, comprising means for monitoring at least one compressor parameter; means for computing stall measures; means for comparing the stall measures with at least one of an average stall measure of similar compressors or a previously computed stall measure for the compressor; and means for initiating corrective actions if the computed stall measure deviates from at least one of the average stall measure or the previously computed stall measure.

In a further aspect, the invention is a method for detecting and compensating for a compressor surge in a gas turbine of the type having a compressor, the method comprising: remotely monitoring at least one compressor parameter; computing stall measures; comparing the stall measures with at least one of an average stall measure of similar compressors or a previously computed stall measure for the compressor; and initiating corrective actions if the computed stall measure deviates from at least one of the average stall measure or the previously computed stall measure.

In yet another aspect, the invention is a method for remotely monitoring and controlling a compressor to prevent a compressor surge condition, the method comprising: (a) monitoring at least one compressor parameter and storing data indicative of the monitored parameter in a remote database system; (b) processing the monitored data using a stall precursor detection algorithm to determine a stall precursor; (c) comparing the stall precursor with at least one of a corresponding average compressor value, and a corresponding unit specific value to determine the level of compressor operability, and (d) if the stall precursor varies from at least one of the average compressor value and the unit specific value, performing corrective actions to vary the level of compressor operability to prevent a surge condition.

BRIEF DESCRIPTION OF THE DRAWINGS

The benefits of the present invention will become apparent to those skilled in the art from the following detailed description, wherein only the preferred embodiment of the invention is shown and described, simply by way of illustration of the best mode contemplated of carrying out the invention.

DETAILED DESCRIPTION OF THE INVENTION

Figure 1:
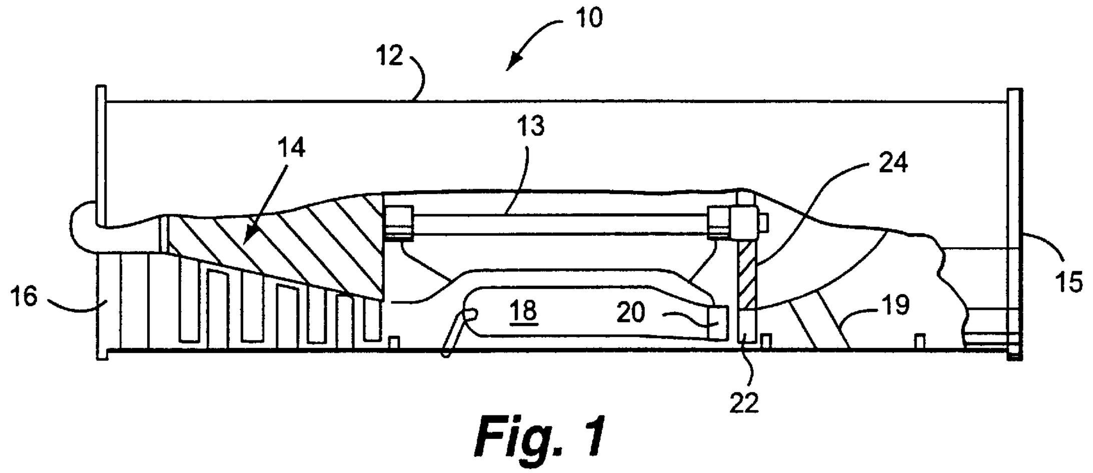
FIG. 1 is a schematic representation of a gas turbine engine.

Referring now to FIG. 1, a gas turbine engine is shown at 10 as comprising a cylindrical housing 12 having a compressor 14, which may be of the axial flow type, within the housing adjacent to its forward end. The compressor 14 receives air through an annular air inlet 16 and delivers compressed air to a combustion chamber 18. Within the combustion chamber 18, air is burned with fuel and the resulting combustion gases are directed by a nozzle or guide vane structure 20 to the rotor blades 22 of a turbine rotor 24 for driving the rotor. A shaft 13 drivably connects the turbine rotor 24 with the compressor 14. From the turbine blades 22, the exhaust gases discharge rearwardly through an exhaust duct 19 into the surrounding atmosphere.

Figure 2:
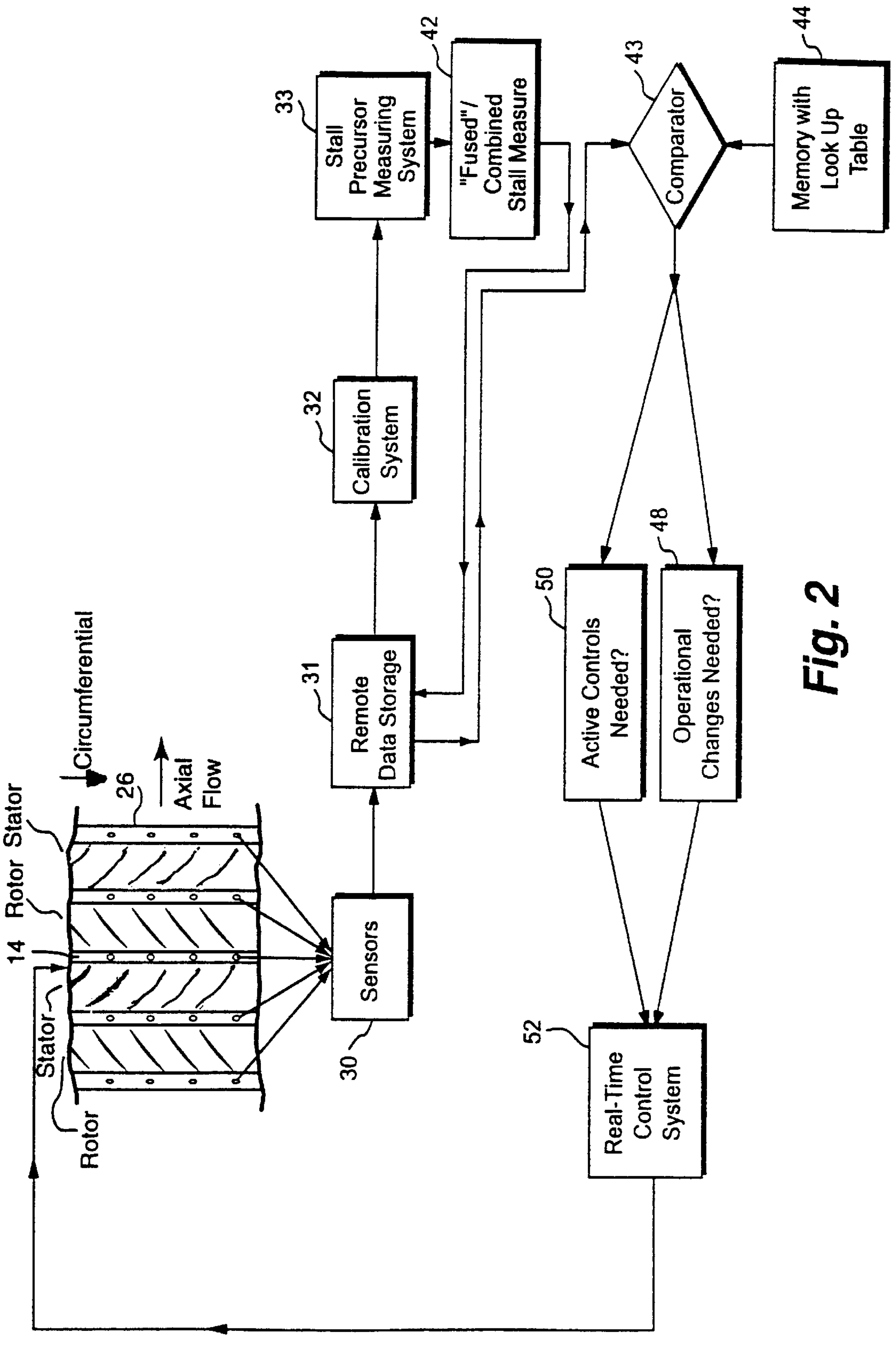
FIG. 2 illustrates a schematic of an apparatus for compressor control by measuring compressor parameters using dynamic pressure sensors disposed along the axial length of the compressor casing, and detecting precursors to rotating stall using the present invention.

FIG. 2 shows an apparatus for monitoring and controlling a compressor. Two stages of the compressor are shown as in FIG. 2, but it should be understood that several compressor stages may be present. Sensors 30 are disposed about the compressor casing 26 for monitoring compressor parameters, such as the pressure and velocity of gases flowing through the compressor. The sensors 30 are preferably dynamic pressure sensors, and one, two or more sensors are axially disposed per compressor stage. There may also be several pressure sensors disposed at circumferential locations at a given axial location on the casing at each stage of the compressor. Dynamic pressure of gases flowing through the compressor is an exemplary stall precursor parameter. Other compressor parameters, such as airflow temperature, compressor vibration, and airflow velocity, may be monitored with appropriate sensors on or in the compressor to determine a stall precursor condition in the compressor 14.

Data collected by the sensors 30 may be transmitted to a remote data storage device 31 via a wired or wireless communication network. The remote data storage device 31 may be a computer memory storage device, for example, hard drive, optical disk, and magnetic tape. The remote data storage device 31 may be remote from the compressor, but located in the power plant with the gas turbine, or it may be located at an off-plant location remote from the power plant. The storage device 31 may also be located in a computer memory in a computer system having a processor for performing stall precursor measurements and comparator operations. Moreover, the computer system with the storage device 31 may be remote from a real-time control system 52 that performs controlling functions on the gas turbine.

The dynamic pressure data collected by sensor(s) 30 is provided to a calibration system 32 for data processing. The calibration system includes an electronic processing unit with associated data and program storage units, and input and output devices. The processing step includes filtering the collected pressure data to remove noise, and time-series, and spectral analysis of the data. It will be appreciated that the present invention should not be construed to limited to time-series and frequency domain analysis. The calibration system may include an A/D (analog-to-digital) converter for digitizing the time-series data. When the amount of stored data received from sensors 30 reaches a predetermined level, a stall precursor detection algorithm embodied in system 33 processes the digitized data received from calibration system 32 and extracts magnitudes of the stall precursors by processing such signal characteristics as, for example, amplitude, rate of change of the monitored parameter, spectral content, etc. The extracted signal characteristics identified as stall precursor measure are combined with similar stall precursor measures measured by each of a plurality of sensors(s) 30. The combined stall measures are stored in the data storage system 31.

Sensor data may also be processed using a plurality of stall precursor detection algorithms operating in parallel, thus increasing the confidence of stall precursor detection. Stall precursor detection algorithms may include such algorithms based on known mathematical techniques such as, for example, Kalman Filter, temporal Fast Fourier Transform (FFT), Chaotic Series, Frequency Demodulation, Correlation Integral, etc. Voting between results obtained via various algorithms as noted above may also be determined. The combined magnitude of the stall measure stored in storage device 31 is compared in a comparator 43 with a stall precursor magnitude of a similar compressor (referred herein as "unit specific characteristic") received and stored in a look-up-table (LUT) 44 to define an upper limit of compressor degradation. The look-up-table 44 is also populated with an average stall precursor magnitude (referred herein as "fleet characteristic") of compressors similar to compressor 14. The LUT 44 is populated with the gas turbine compressor unit specific characteristics and average characteristics on a dynamic basis. Furthermore, historical stall precursor data of a compressor may also be stored in storage device 31, and the current level of compressor operability is compared with a prior level of operability to determine compressor degradation.

The gas turbine compressor unit specific characteristic is compared with a most recent stall precursor measure of compressor 14. If the measurements are congruent and superior to the average unit specific characteristic, then active controls are deemed necessary as indicated at 50, and the real time control system 52 is instructed to elevate the Operating Limit Line (OLL) of compressor 14. The operating line limit is an empirically derived limit that is used to avoid operating the compressor in surge conditions.

On the other hand, if the comparison of the unit specific characteristic with most recent stall precursor measure of compressor 14 indicates incongruency, e.g., the actual operating conditions exceed the unit specific characteristic, the imminent surge in the compressor 14 is inferred. If an imminent surge is inferred, the operation of compressor may be adjusted by making operations changes as indicated at 48 to avoid the occurrence surge. The real-time control system 52 is instructed to lower the operating limit line parameters of the compressor to maintain predetermined level of compressor operability, e.g., surge margin, and to increase the margin between the operation of the compressor and surge conditions.

Control system 52 may also inform an operator via maintenance flags or a visual warning and the like, regarding compressor operability and surge conditions. The compressor operability measure estimated at 48 may instead be provided to a decision making computer system to provide appropriate indicators, as noted above, to an operator.

Comparison of monitored compressor parameter to that of baseline compressor values is indicative of the operability of the compressor and is useful to predict a compressor surge event. The compressor operability data may be used to initiate the desired control system corrective actions to prevent a compressor surge, thus allowing the compressor to operate with a higher pressure-ratio than if additional surge margin were required to avoid near a surge operation. The higher compressor pressure ratio and thus cycle pressure ratio enable greater combined cycle power plant efficiency and output.

Figure 3:
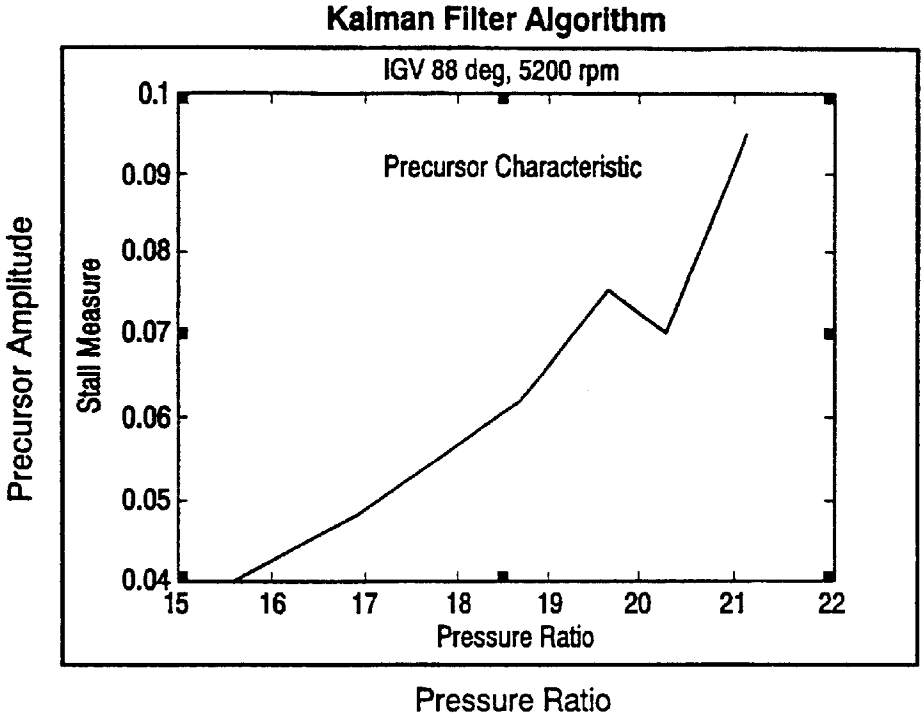
FIG. 3 illustrates an exemplary plot of precursor characteristic computed for a plurality of compressors to produce a fleet average using a Kalman Filter algorithm.

FIG. 3 shows a graphical plot of an average (fleet average) of stall precursor characteristics computed for a plurality of compressors in operation in an installed base of gas turbines. The precursor characteristic may be empirically determined based on testing of compressors and field data of gas turbine compressors in power plants. Each precursor characteristic may correlate an operating condition of a gas turbine to some stall measure value that is indicative of the potential for surge at a specific operation condition. For example, the pressure ratio across the compressor, for a constant rotational speed and compressor inlet guide setting, may be correlated to a "stall measure". This stall measure may have a low value, e.g., 0.04, for low pressure-ratios and a high value, e.g.., 0.09, for high pressure- ratios. The actual correlation between pressure ratio and stall measure may empirically determined by test measurements of the compressor (or of a similar compressor).

Figure 4:
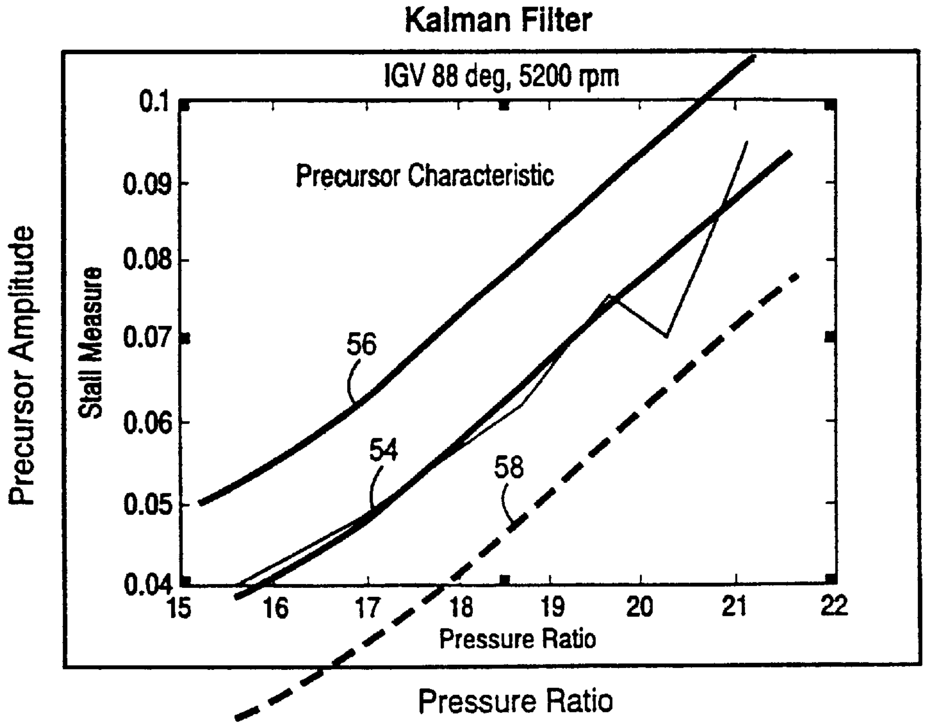
FIG. 4 is an exemplary plot of precursor characteristic for one set of measurements of a subject compressor compared with the fleet average as illustrated in FIG. 3.

FIG. 4 depicts a plot comparing fleet average with the precursor characteristic for compressor 14 (FIG. 2). The plot of FIG. 4 tracks the operative level and degradation of compressor 14. The stall precursor characteristic for a plurality of similar compressors is indicated at 54. Line 56 indicates the precursor characteristic for a deteriorated compressor having a level of operability that is lower when compared to average compressor operability of similar compressors. The Operating Limit Line (OLL) parameters of the deteriorating compressor are varied to bring its operating level close to the desired level of operability as indicated by 54. Likewise, the level of operability as indicated by 58 of a new compressor may be improved without the likelihood of compressor surge until the pressure ratio of the new compressor reaches the desired level indicated at 54. The Operating Limit Line parameters may be modified to enhance the pressure ratio of the new compressor, thus enhancing power plant output and efficiency.

If the current level of operability of compressor 14 is estimated to be superior to fleet average health, then Operating Limit Line of compressor 14 is elevated to increase its pressure ratio. If the current health of compressor 14 is estimated to be inferior to fleet average health, the Operating Limit Line is decreased in order to avoid a compressor surge. Potential actions that may be initiated upon detecting an elevated stall precursor signal include, for example, (1) tripping the gas turbine off-line in an extreme case, (2) obtaining a second set of measurements by interrogating other sensors, e.g., inlet filter pressure drop instrumentation, (3) decreasing firing temperature, and (4) degrading the compressor surge line.

Other corrective actions may include varying the operating line control parameters such as, for example, making adjustments to compressor variable vanes, inlet air heat, compressor air bleed, combustor fuel mix, etc. These adjustments are made to operate the compressor at a near surge threshold level in order to ensure that the surge margin is narrow, but sufficient, to avoid surge. A narrow surge margin is safe because the system continually monitors the compressor for stall precursors that would forewarn if a compressor surge were to occur. Preferably, any corrective actions needed to avoid surge are initiated prior to the occurrence of compressor surge, and within the surge margin identified between a operating line threshold value and the occurrence of a compressor surge event. These corrective steps are iterated until the desired level of compressor operability is achieved. Stall precursors are used to assess the proximity to surge, and the modulation of the Operating Limit Line (OLL) to maintain the desired surge margin throughout the range of operating condition. Thus, the present invention utilizes the pressure ratio capability of an industrial gas turbine compressor 14 to achieve power plant operating efficiencies, without increasing operational risks associated with a compressor surge.

Figure 5:
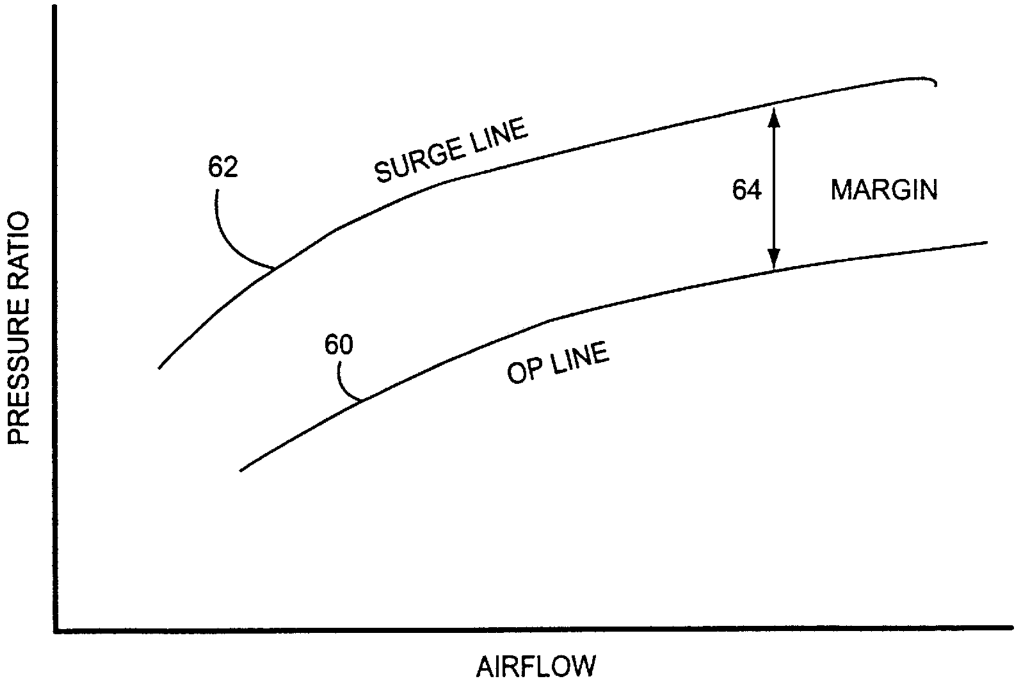
FIG. 5 illustrates a graph charting pressure ratio on Y-axis and airflow on X-axis for the compressor stage as shown in FIG. 2.

FIG. 5 is a graph charting pressure ratio on the Y-axis and airflow on the X-axis. The acceleration of a gas turbine engine may result in a compressor surge wherein the pressure ratio of the compressor may initially exceed some critical value, resulting in a subsequent drastic reduction of compressor pressure ratio and airflow delivered to the combustor. If such a condition is undetected and allowed to continue, the combustor temperatures and vibratory stresses induced in the compressor may become sufficiently high to cause damage to the gas turbine. Thus, the corrective actions initiated in response to detection of an onset or precursor to a compressor surge, such as a rotating stall may prevent the problems identified above from taking place. The OPLINE identified at 60 depicts an operating line at which the compressor 14 is operating. As the airflow is increased into the compressor 14, the compressor may be operated at an increased pressure ratio. The surge margin 64 indicates that once the gas turbine engine 10 operates at values beyond the values set by the OPLINE as illustrated in the graph, a signal indicative of onset of a compressor surge is issued. Corrective measures by the real-time control system 52 may have to be initiated to operate the compressor within the margin 64 and to avoid a compressor surge.

The present system provides for high cycle pressure ratio commensurate with high efficiency and ample surge margin throughout the operating range of the compressor. The present system further provides a design and an operational strategy that provides optimal pressure ratio and surge margin for cases wherein the Inlet Guide Vanes (IGVs) are tracking along the nominal, full-flow schedule, and wherein the IGVs are closed-down for reduced flow under power-turn-down conditions. The present system also permits operation of the gas turbine 10 at a higher pressure-ratio, thus enabling higher efficiency and output, and less inlet bleed heat during cold ambient conditions. Immediate up-rate of some compressor units is also made possible by taking advantage of favorable unit-to-unit variations by the present invention.

While the invention has been described in connection with what is presently considered to be the most practical and preferred embodiment, it will be understood that the invention is not to be limited to the disclosed embodiment, but on the contrary, is intended to cover various modifications and equivalent arrangements included within the spirit and scope of the appended claims.

What is claimed is:

1. A method for monitoring and controlling a compressor, comprising:

(a) monitoring at least one compressor parameter;

(i) storing data indicative of the monitored parameter in a database system;

(b) processing the collected data using a stall precursor detection algorithm to determine a stall precursor;

(c) comparing the stall precursor with at least one of a corresponding average compressor value, and a corresponding unit specific value to determine the level of compressor operability, and (d) if the stall precursor varies from at least one of said average compressor value and said unit specific value, performing corrective actions to vary the level of compressor operability to prevent a surge condition.

2. The method of claim 1 further comprising step (e) of iterating steps (a) to (d) until the monitored at least one compressor parameter is within predetermined thresholds.

3. The method of claim 1, wherein step (b) further comprising:

(i) computing a stall precursor signal magnitude to generate stall precursor characteristic; and (ii) storing stall precursor characteristic data in said database system.

4. The method of claim 1, wherein step (d) further comprises:

(i) increasing the output of the compressor if the level of operation of the compressor is superior to at least one of said average value and said unit specific characteristic; and (ii) lowering the output of the compressor if the level of operation of the compressor is inferior to at least one of said average value and said unit specific characteristic.

5. The method of claim 4, wherein said output is varied by varying the operating line parameters.

6. The method of claim 5, wherein said output is varied by varying the compressor loading.

7. The method of claim 5, wherein said operating line parameters are set to a near-threshold value.

8. The method of claim 1 wherein the storage of data and database system are remote from the compressor.

9. An apparatus for monitoring a compressor, comprising:

at least one sensor operatively coupled to the compressor for monitoring at least one compressor parameter;

a processor system for computing stall precursors from the monitored data;

a database system for storing said at least one compressor parameter and said computed stall precursors, said database system further comprising a look-up-table comprising average compressor values for similar compressors;

a comparator for comparing the computed stall precursors with at least one of an average precursor value and a previously computed stall measure of the compressor; and a control system for initiating corrective actions to prevent a compressor surge if the computed stall precursors deviate from at least one of said average precursor value and said previously computed stall measure.

10. The apparatus of claim 9, wherein the corrective actions are initiated by varying operating limit line parameters.

11. The apparatus of claim 9, wherein said operating limit line parameters are set to a near-threshold value.

12. The apparatus of claim 9, wherein the compressor is in a gas turbine.

13. In a gas turbine of the type having a compressor, a combustor, and a turbine, a method for monitoring the compressor comprising:

(a) monitoring at least one compressor parameter and collecting data indicative of the compressor parameter;

(b) processing the monitored data using a stall precursor detection algorithm to determine a stall precursor;

(c) comparing the stall precursor with at least one of a corresponding average compressor value, and a corresponding unit specific value to determine the level of compressor operability, and (d) if the stall precursor varies from at least one of said average compressor value and said unit specific value, performing corrective actions to vary the level of compressor operability to prevent a surge condition.

14. The method of claim 13 further comprising step (e) of iterating steps (a) to (d) until the monitored at least one compressor parameter is within predetermined thresholds.

15. The method of claim 13, wherein step (b) further comprising:

(i) computing a stall precursor signal magnitude to generate stall precursor characteristic; and (ii) storing stall precursor characteristic data.

16. The method of claim 13, wherein step (d) further comprises:

(i) increasing the output of the compressor if the level of operation of the compressor is superior to at least one of said average value and said unit specific characteristic; and (ii) lowering the output of the compressor if the level of operation of the compressor is inferior to at least one of said average value and said unit specific characteristic.

17. The method of claim 16, wherein said output is varied by varying the operating line parameters.

18. The method of claim 17, wherein said output is varied by varying the compressor loading.

19. The method of claim 17, wherein said operating line parameters are set to a near-threshold value.

20. An apparatus for monitoring and controlling a compressor, comprising:

means for monitoring at least one compressor parameter;

means for computing stall measures;

means for comparing the stall measures with at least one of an average stall measure of similar compressors or a previously computed stall measure for the compressor; and means for initiating corrective actions if the computed stall measure deviates from at least one of said average stall measure or said previously computed stall measure.

21. The apparatus of claim 20, wherein the corrective actions are initiated by varying operating limit line parameters.

22. The apparatus of claim 21, wherein said operating limit line parameters are set to a near-threshold value.

23. A method for detecting and compensating for a compressor surge in a gas turbine of the type having a compressor, comprising:

remotely monitoring at least one compressor parameter;

computing stall measures;

comparing the stall measures with at least one of an average stall measure of similar compressors or a previously computed stall measure for the compressor; and initiating corrective actions if the computed stall measure deviates from at least one of said average stall measure or said previously computed stall measure.

24. A method for remotely monitoring and controlling a compressor to prevent a compressor surge condition, the method comprising:

(a) monitoring at least one compressor parameter and storing data indicative of the monitored parameter in a remote database system;

(b) processing the monitored data using a stall precursor detection algorithm to determine a stall precursor;

(c) comparing the stall precursor with at least one of a corresponding average compressor value, and a corresponding unit specific value to determine the level of compressor operability, and (d) if the stall precursor varies from at least one of said average compressor value and said unit specific value, performing corrective actions to vary the level of compressor operability to prevent a surge condition.

25. The method of claim 24 further comprising step (e) of iterating steps (a) to (d) until the monitored at least one compressor parameter is within predetermined thresholds.

26. The method of claim 24, wherein step (b) further comprising:

(i) remotely computing a stall precursor signal magnitude to generate stall precursor characteristic; and (ii) storing stall precursor characteristic data in said remote database system.

* * * * *